United States Patent [19]
Hulse et al.

[11] B 3,929,742
[45] Dec. 30, 1975

[54] POLY(P-BENZENESULFONAMIDE)
[75] Inventors: George E. Hulse; R. James Kersting, both of Pittsburgh, Pa.
[73] Assignee: ARCO Polymers, Inc., Philadelphia, Pa.
[22] Filed: July 23, 1973
[21] Appl. No.: 382,018
[44] Published under the Trial Voluntary Protest Program on January 28, 1975 as document no. B 382,018.

[52] U.S. Cl. ............................ 260/79.3 R; 260/78 A
[51] Int. Cl.² .......................................... C08G 75/30
[58] Field of Search .............................. 260/79.3 R

[56] References Cited
UNITED STATES PATENTS
3,371,073  2/1968  Smith ............................ 260/79.3 R
3,579,475  5/1971  Jones et al. ..................... 260/79.3 R
3,696,092  10/1972 Tesoro ........................... 260/79.3 R
3,709,844  1/1973  Herweh et al. .................. 260/79.3 R FOREIGN PATENTS OR APPLICATIONS
1,008,854  11/1965  United Kingdom ................... 260/78

Primary Examiner—Ronald W. Griffin
Attorney, Agent, or Firm—Lewis J. Young

[57] ABSTRACT

Poly(p-benzenesulfonamide) has been prepared by the transamidation of $N^1,N^1$-dimethylsulfanilamide hydrochloride in a melt reaction at 180°C. The polymers form brittle films when cast from solution and have a glass transition temperature, Tg, of 180°–190°C. at a degree of polymerization of about 6.

1 Claim, No Drawings

POLY(P-BENZENESULFONAMIDE)

BACKGROUND OF THE INVENTION

A structural characteristic of many high temperature thermoplastic polymers is the presence of an aromatic ring in the polymer backbone. Examples are polymers based upon p-aminobenzoic acid, p-hydroxybenzoic acid and the aryl sulfones. Fully aromatic polysulfonamides constitute another area of potential development. The traditional method of polysulfonamide preparation has been the condensation of disulfonyl chlorides with diamines.

A logical method of preparing poly(p-benzenesulfonamide) would be by the self-condensation of sulfanilyl chloride. In U.S. Pat. No. 3,371,073 (column 1, line 69–72), this method is stated as a possibility. However, sulfanilyl chloride has not been reported in the literature, and all attempts by us to prepare the compound have been unsuccessful. N-acetylsulfanilyl chloride has been prepared and polymerized by self-condensation to poly(N-acetyl-p-benzenesulfonamide).

It is known that aromatic sulfonamides, such as benzenesulfonamide, can be made to undergo transamidation with an amine hydrochloride.

SUMMARY OF THE INVENTION

We have now found that poly(p-benzenesulfonamide) can be prepared by the transamidation of $N^1,N^1$-dimethylsulfanilamide hydrochloride. The hydrochloride is heated at about 180°C. for at least 1 hour, either under nitrogen or in an evacuated tube. The product has a softening point around 210°C. as observed in a capillary melting point tube. Glass transition temperatures between 180° and 190°C. were observed by differential scanning calorimetry on polymers of degree of polymerization of about 6.

DETAILED DESCRIPTION OF THE INVENTION

It is known that aromatic sulfonamides undergo transamidation with aromatic amine hydrochlorides or hydrobromides. For example, $N^1,N^1$-dimethylbenzenesulfonamide reacts on heating in the melt with aniline hydrochloride to give benzenesulfanilide and dimethylamine.

We have now found that if the sulfonamide grouping and the amine hydrochloride (or hydrobromide) group are both in the same molecule, heating of the melt of the compound gives a transamidation reaction resulting in polymeric sulfonamides.

In particular, poly(p-benzenesulfonamide) is formed by heating at a temperature of 180° to 210°C. a melt of a compound having the general formula $R'R''N \cdot SO_2 \cdot C_6H_4 \cdot NH_3X$; where X is Br or Cl; and R' and R'' may be the same or different and are H, alkyl having from 1–4 carbon atoms such as methyl, ethyl, propyl, isopropyl and butyl, or R' and R'' together comprise a cyclic alkylene such as tetramethylene or pentamethylene.

Compounds especially suitable for the present invention are the di-alkylsulfanilamide salts, such as $N^1,N^1$-dimethylsulfanilamide hydrochloride. The unsubstituted sulfanilamide, and mono-alkylated sulfanilamides are suitable, but produce polymers of lower degree of polymerization and lower glass transition temperatures.

The heating may be done under an atmosphere of nitrogen or in an evacuated tube. The preferred temperature of heating is 180°C. Above 180°C., side reactions leading to discolored product assumed increasing importance as the temperature increased.

The reaction appears to reach completion after 1 hour heating time. Times as long as 24 hours have been used without any appreciable effect on the polymer yield or the molecular weight of the polymers. The reaction mass sets up to a glassy solid. The product is isolated by dissolving the polymer in aqueous alkali and precipitating the product as a white powder by acidifying with acetic acid to a pH of 4–6.

The poly(p-benzenesulfonamide) shows a softening point of about 210°C. as observed in a capillary melting point tube. The polymeric nature of the product is shown by the observation of glass transition temperature for the product.

Further indication of the polymeric nature of the product is given by the ability to cast brittle films from acetone or dimethylformamide solution. The polymer decomposes when heated to 310°C. on a differential scanning calorimeter. At 310°C. the melt quickly changes to a black solid within a minute.

The invention is further illustrated by the following examples.

EXAMPLE I

Into a round bottom flask equipped with a mechanical stirrer, gas inlet tube and dry ice condenser, was placed a solution of 280g. N-acetylsulfanilyl chloride dissolved in 3 liters of acetone, and 104g. of sodium bicarbonate. Dimethylamine (100g.) was distilled through the gas bubbler into the reactor over a 4 hour period and the whole was heated to reflux for 1 hour. After sitting overnight, the solution was filtered and a portion of the acetone removed by distillation. Cooling of the solution gave 136g. (47% yield) of $N^1,N^1$-dimethyl-N-acetylsulfanilamide, m.p. 140°–45°C.

A 20g. portion of the dimethylacetylsulfanilamide was hydrolyzed by refluxing for 10 minutes with 20 ml. of concentrated hydrochloric acid over 40 ml. of water. The $N^1,N^1$-dimethylsulfanilamide, m.p. 168°–72°C., was recovered in 91% yield.

A solution of 5g. of the sulfanilamide in 400 ml. methylene chloride was treated with anhydrous hydrogen chloride to give the $N^1,N^1$-dimethylsulfanilamide hydrochloride, m.p. 175°C.

The sulfanilamide hydrochloride was placed in each of 6 combustion tubes and the tubes sealed under vacuum. The tubes were heated in an oil bath at 180°C. for the times shown in Table I. The products were isolated by crushing the crude reaction mass, dissolving the product in 10% aqueous alkali, and precipitating the poly(p-benzenesulfonamide) by adding acetic acid to a pH of 5–6. The polymers were white powders having glass transition temperatures, Tg, and number average degree of polymerization (DP) as shown in the table. The Tg were measured by a differential scanning calorimeter. DP was measured by analysis of the amide end groups by nuclear magnetic resonance spectroscopy.

TABLE I

| Sample No. | Time (hrs) | DP | Tg.,°C. |
| --- | --- | --- | --- |
| 1 | 1.5 | 5.5 | 180 |
| 2 | 3.0 | 5.5 | 190 |
| 3 | 4.5 | 5.6 | 185 |
| 4 | 6.5 | 7.2 | 185 |
| 5 | 8.5 | 5.2 | 183 |
| 6 | 10.5 | 5.9 | 182 |

The maximum DP was apparently achieved early in the reaction, and the DP is rather low. By increasing the temperature to 210°C, polymer having DP of 14 was obtained, but chain branching was found to be more prevalent.

All samples were soluble in acetone, and could be cast into brittle films from acetone or dimethylformamide.

EXAMPLE II

To illustrate the greater effectiveness of the dialkylated amides in the pyrolysis of the invention, several hydrochlorides of sulfanilamides having the formula, $R_2R_2N \cdot SO_2 \cdot C_6H_4 \cdot NH_3Cl$, were pyrolyzed at temperatures as indicated in Table II. The resulting DP and Tg of the poly(p-benzenesulfonamide) are reported in the table.

TABLE II

| $R_1$ | $R_2$ | Time (hours) | Temp. (°C) | DP | Tg (°C) |
|---|---|---|---|---|---|
| H | H | 6 | 187 | 4.4 | 146 |
| H | H | 13 | 187 | 3.8 | 152 |
| H | H | 22.5 | 187 | 4.4 | 150 |
| H | $CH_3$ | 4 | 180 | 2.3 | * |
| H | $CH_3$ | 24 | 180 | 2.5 | 76 |
| $CH_3$ | $CH_3$ | 1.5 | 180 | 5.5 | 180 |
| $CH_3$ | $CH_3$ | 3.0 | 180 | 5.5 | 190 |
| $CH_3$ | $CH_3$ | 1.3 | 210 | 6.0 | 169 |
| $CH_3$ | $CH_3$ | 6.5 | 210 | 12.0 | 206 |
| —$(CH_2)_5$— | | 3.0 | 180 | 3.8 | 150 |
| —$(CH_2)_5$— | | 10.5 | 180 | 3.9 | 155 |

* no Tg; m.p. 90°C.; pure dimer (DP 2.0) melts 137°C.

Because $N^1$-methylsulfanilamide hydrochloride melts higher (210°C) than the desired reaction temperature, a mixture consisting of 0.46 mole fraction of the hydrochloride and 0.54 mole fraction of the free base was used in the two runs with this compound. The data shows that it is possible to prepare low molecular weight poly(p-benzenesulfonamide) by pyrolysis of the hydrochlorides of sulfanilamide, mono-alkylated sulfanilamides, and di-alkylated sulfanilamides. The highest molecular weights are obtained when the $N^1,N^1$-dialkylsulfanilamide hydrochloride is used as starting material.

What is claimed is:
1. A process for preparing poly(p-benzenesulfonamide) comprising:
  a. heating for at least 1 hour at a temperature of 180° to 210°C. in the absence of air, a melt of a compound having the general formula, $R'R''N \cdot SO_2 \cdot C_6H_4 \cdot NH_3X$, where X is Br or Cl; and R' and R'' may be the same or different and are H, alkyl having from 1–4 carbon atoms, or R' and R'' together comprise a cyclic alkylene;
  b. dissolving the heated melt in aqueous alkali; and
  c. acidifying the solution by adding acid to a pH of 4–6, whereby the poly(p-benzenesulfonamide) precipitates.

* * * * *